United States Patent [19]

Shindo et al.

[11] E Patent Number: Re. 33,707

[45] Reissued Date of Patent: Oct. 1, 1991

[54] AUTOMATIC TRANSMISSION WITH OVERDRIVE

[75] Inventors: Yoshio Shindo, Toyota; Hiroshi Ito, Aichi, both of Japan

[73] Assignee: Toyota Jidosha Kabushiki Kaisha

[21] Appl. No.: 323,017

[22] Filed: Mar. 13, 1989

Related U.S. Patent Documents

Reissue of:

[64] Patent No.: 4,274,303
Issued: Jun. 23, 1981
Appl. No.: 966,592
Filed: Dec. 5, 1978

U.S. Applications:

[63] Continuation of Ser. No. 832,828, Sep. 13, 1977, abandoned.

[30] Foreign Application Priority Data

Apr. 27, 1977 [JP] Japan ..... 52-47877

[51] Int. Cl.[5] ..... F16H 37/00; F16H 57/02

[52] U.S. Cl. ..... 475/59; 74/606 R; 475/311

[58] Field of Search ..... 74/740, 606 R, 606 A, 74/688, 781 R

[56] References Cited

U.S. PATENT DOCUMENTS

| | | | |
|---|---|---|---|
| 2,505,857 | 5/1950 | Gregory | 74/781 R X |
| 2,576,336 | 11/1951 | Farkas | 74/688 X |
| 2,916,932 | 12/1959 | Patterson | 74/740 X |
| 2,978,928 | 4/1961 | Tuck et al. | 74/645 |
| 3,053,115 | 9/1962 | Cartwright | 74/606 R X |
| 3,173,310 | 3/1965 | Moan | 74/688 |
| 3,237,476 | 3/1966 | Jandasek | 74/781 R X |
| 3,282,129 | 11/1966 | Gabriel | 74/688 X |
| 3,403,584 | 10/1968 | Ellis et al. | 74/688 X |
| 3,424,034 | 1/1969 | Wickman | 74/761 |
| 3,444,761 | 5/1969 | Wickman | 74/740 |
| 3,463,033 | 8/1969 | Fisher | 74/688 |
| 3,473,411 | 10/1969 | Paredes | 74/781 R X |
| 3,543,607 | 12/1970 | Schmidt et al. | 74/688 |
| 3,724,292 | 4/1973 | Borman | 74/864 |
| 3,797,332 | 3/1974 | Cameron et al. | 74/781 R X |
| 4,274,303 | 6/1981 | Shindo et al. | 74/740 |

FOREIGN PATENT DOCUMENTS

| | | | |
|---|---|---|---|
| 1343427 | 10/1963 | France | 74/606 A |
| 46-3360 | 10/1971 | Japan . | |
| 48-14942 | 2/1973 | Japan . | |
| 50-135469 | 10/1975 | Japan . | |
| 51-119464 | 10/1976 | Japan . | |
| 52-52067 | 4/1977 | Japan . | |
| 1289255 | 9/1972 | United Kingdom . | |

OTHER PUBLICATIONS

ATZ Publication 77 Jahrgang Nr. 9, Sep. 1975.
ATZ Publication 77 Jahrgans, Nr. 12, Dec. 1975.

*Primary Examiner*—Dwight G. Diehl
*Attorney, Agent, or Firm*—Toren, McGeady & Associates

[57] ABSTRACT

An automatic transmission including: a torque converter; a torque converter housing; an oil pump; an overdrive gear mechanism; an overdrive case; an underdrive gear mechanism; a transmission case for the underdrive gear mechanism; an oil pan under the underdrive gear mechanism; and a hydraulic control device controlling a hydraulic pressure to be delivered to the overdrive and underdrive gear mechanisms. In this automatic transmission, the overdrive case is formed with a first passage connected to an inlet port of the oil pump, a second passage connected to a discharge port of the oil pump, a third passage connected to an inlet port of the torque converter, and a fourth passage connected to an outlet port of the torque converter, with the second, third and fourth passages being connected to the hydraulic control device.

8 Claims, 3 Drawing Sheets

AUTOMATIC TRANSMISSION WITH OVERDRIVE

Matter enclosed in heavy brackets [ ] appears in the original patent but forms no part of this reissue specification; matter printed in italics indicates the additions made by reissue.

This is a continuation of application Ser. No. 832,828 filed Sept. 13, 1977 now abandoned.

BACKGROUND OF THE INVENTION (1) Field of the Invention

This invention relates to an automatic transmission for use in an automobile vehicle, and more particularly to an automatic transmission having an overdrive gear mechanism positioned between a hydrokinetic torque converter and an underdrive.

(2) Description of the Prior Art

As is well known, an automatic transmission for an automotive vehicle operates to automatically change gear reduction ratios in response to vehicle speed and load on the engine. Automatic transmissions consist in general of a torque converterand an underdrive gear mechanism which is coupled to the converter and establishes two or more gear reduction ratios of no less than 1. Recently, a demand has arisen for an automatic transmission with an overdrive which is more economical from the viewpoint of fuel consumption.

SUMMARY OF THE INVENTION

According to the present invention, there is provided an automatic transmission with overdrive, which includes: a hydrokinetic torque converter having a pump impeller, stator vanes, and turbine vanes; a housing accommodating the torque converter therein; an oil pump having an oil pump body positioned adjacent to the torque converter, and an oil pump cover partitioning a pump chamber from the oil pump body; an overdrive gear mechanism positioned adjacent to the oil pump but in coaxial relationship to the torque converter, with an input side of the mechanism being coupled to turbine vanes in the torque converter, thereby transmitting torque from an input side to an output side at a gear reduction ratio of 1 or less than 1; an overdrive case surrounding the overdrive gear mechanism in cooperation with the oil pump cover; an underdrive gear mechanism positioned adjacent to the overdrive gear mechanism but in coaxial relationship to the torque converter, with an input side thereof being coupled to an output side of the overdrive gear mechanism, thereby transmitting torque from an input side to an output side at two or more gear reduction ratios of no less than 1; a transmission case encompassing the top and side of elements of the underdrive gear mechanism in cooperation with the overdrive case; an oil pan encompassing the undersurface of the underdrive gear mechanism, and adapted to store oil therein; and a hydraulic control device controlling a hydraulic pressure to be delivered to the overdrive gear mechanism and underdrive gear mechanism.

In addition, the overdrive case is formed with a first passage connected to an inlet port of the oil pump, a second passage connected to a discharge port of the oil pump, and a third passage connected to an inlet port for the torque converter, and a fourth passage connected to an outlet port of the torque converter, with the second, third and fourth passages being connected to the hydraulic control device.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
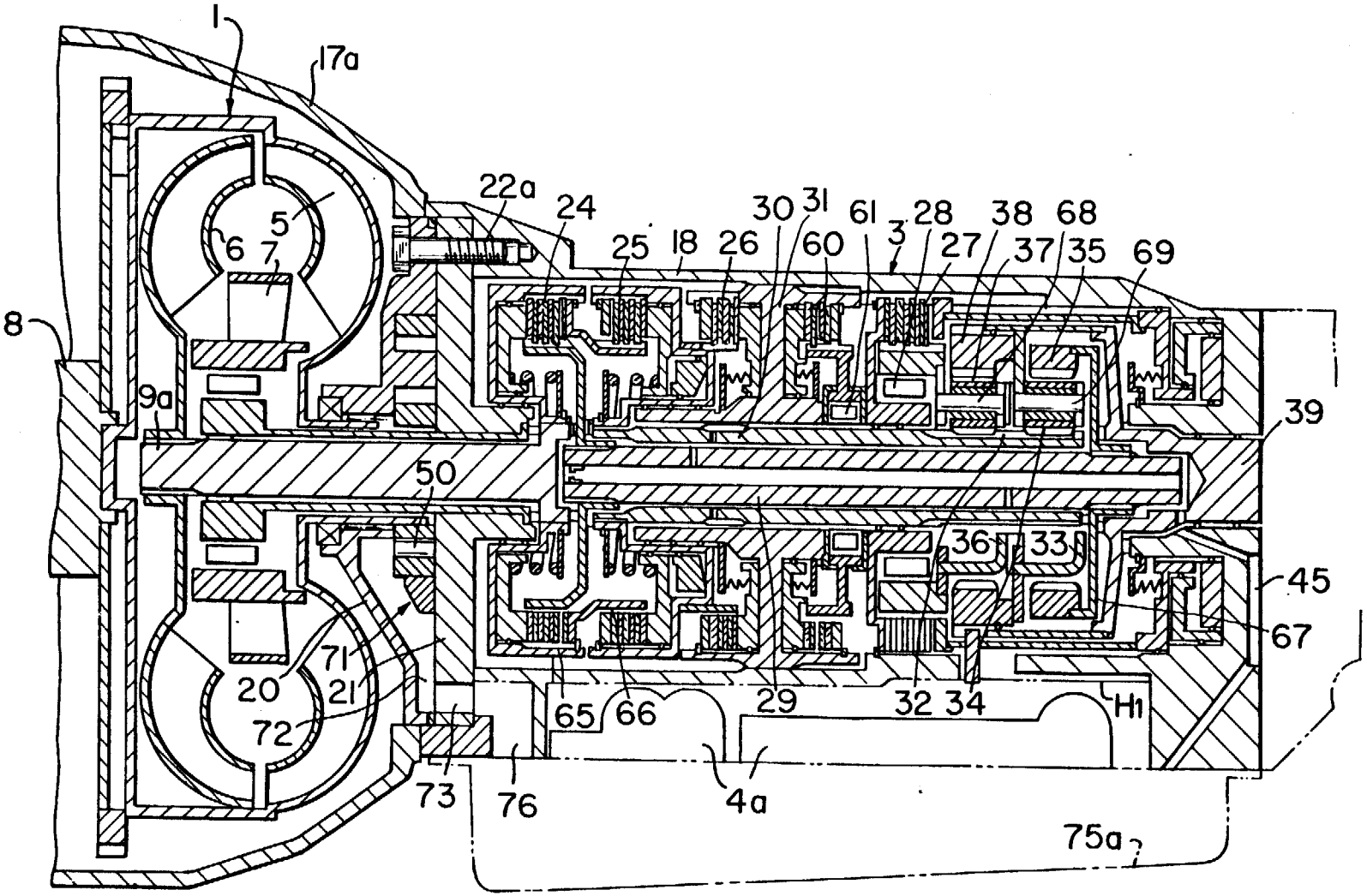
FIG. 1 PRIOR ART
FIG. 1 is a longitudinal cross-sectional view of an automatic transmission which is devoid of an overdrive gear mechanism and of the type, which has been produced in a production line.

FIG. 1 is a longitudinal cross-sectional view of an automatic transmission of the type, which is used in an automobile available in the market. A hydrokinetic torque converter 1 includes a pump impeller 5, turbine vanes 6 and stator vanes 7. The pump impeller 5 is coupled to a crank shaft 8 of an engine (not shown), while the turbine vanes 6 are coupled to a turbine shaft 9a. The torque converter 1 is encompassed with a housing 17a in the radial direction thereof. The rear side of torque converter 1 is closed with an oil pump body 20. In this respect, the side closer to the engine is referred to as the front side, and the side away from the engine is referred to as the rear side.

An oil pump cover 21 is placed adjacent to the oil pump body 20 and defines a pump chamber for accommodating an oil pump 71 therein, in cooperation with the oil pump body 20. An oil pump gear 50 in the oil pump 71 is coupled to the pump impellers 5. A passage 72 defined in the oil pump body 20 is connected to an inlet port for the oil pump 71 as well as to a passage 73 defined in a lower portion of the oil pump cover 21.

Positioned in the rear of the oil pump 71 but adjacent to the oil pump cover 21 in coaxial relation to the torque converter 1 is an underdrive gear mechanism for three-forward-speed and one-reverse-speed drive. The turbine shaft 9a serves as an input shaft of the underdrive gear mechanism 3. A front portion of the underdrive gear mechanism 3 is encompassed with the oil pump cover 21 and transmission case 18. The oil pump body 20, oil pump cover 21 and transmission case 18 are fastened together by means of two or more bolts 22a.

The turbine shaft 9a is coupled to a clutch cylinder 65, while a multiple disc clutch 24 is interposed between the clutch cylinder 65 and an intermediate shaft 29. A hub 66 is fitted in the clutch cylinder 65, while a multiple disc clutch 25 is disposed between the hub 66 and a sun gear shaft 30. Positioned between the sun gear shaft 30 and a support 31 secured to the transmission case 18 are a multiple disc brake 26, and a series connection of a one-way clutch 61 and a multiple disc brake 60. The sun gear shaft 30 is formed with a sun gear 32. The sun gear 32 meshes with planetary pinions 34 and 37, while one of planetary pinion 37 meshes with a ring gear 38, and the other of planetary pinion 34 meshes with a ring gear 35. In other words, there are provided two-row planetary gear units consisting of a combination of sun gear 32, planetary pinion 34 and ring gear 35 and another combination of sun gear 32, planetary pinion 37 and ring gear 38. The ring gear 35 is coupled through the medium of a flange 67 to the intermediate shaft 29. The planetary pinion 34 is rotatably supported on a pinion shaft 69, while the planetary pinion 37 is rotatably supported on a pinion shaft 68 mounted on a carrier 36. An output shaft 39 of the underdrive gear mechanism 3 is coupled to the ring gear 38 and carrier 33. Provided between a carrier 36 and transmission case 18 are a multiple disc brake 27 and a one-way clutch 28.

A lower side of the underdrive gear mechanism is covered with an oil pan 75a. The oil pan 75a accommodates therein a hydraulic control device 4a adapted to control a hydraulic pressure to be delivered to a hydraulic servo (cylinder) for the underdrive gear mechanism. A passage 76 formed under the front end of transmission case 18 connects an oil passage 73 provided in the oil pump cover 21 to the interior of oil pan 75a.

In addition to the oil passage 73, the oil pump cover 21 (partially shown) is provided with an oil passage connecting a hydraulic control device 4a to the clutch cylinder 65, and another oil passage connecting a discharge port of the oil pump 71 to the hydraulic control device 4a. In addition, an oil passage for delivering oil from the hydraulic control device 4a to the torque converter 1, and an oil passage for returning oil from the torque converter 1 to the hydraulic control device 4a are formed in the oil pump body 20 and oil pump cover 21.

Meanwhile, a level H1 as shown in FIG. 1 represents the height or level of oil during normal cruising of the motor vehicle.

Figure 2:
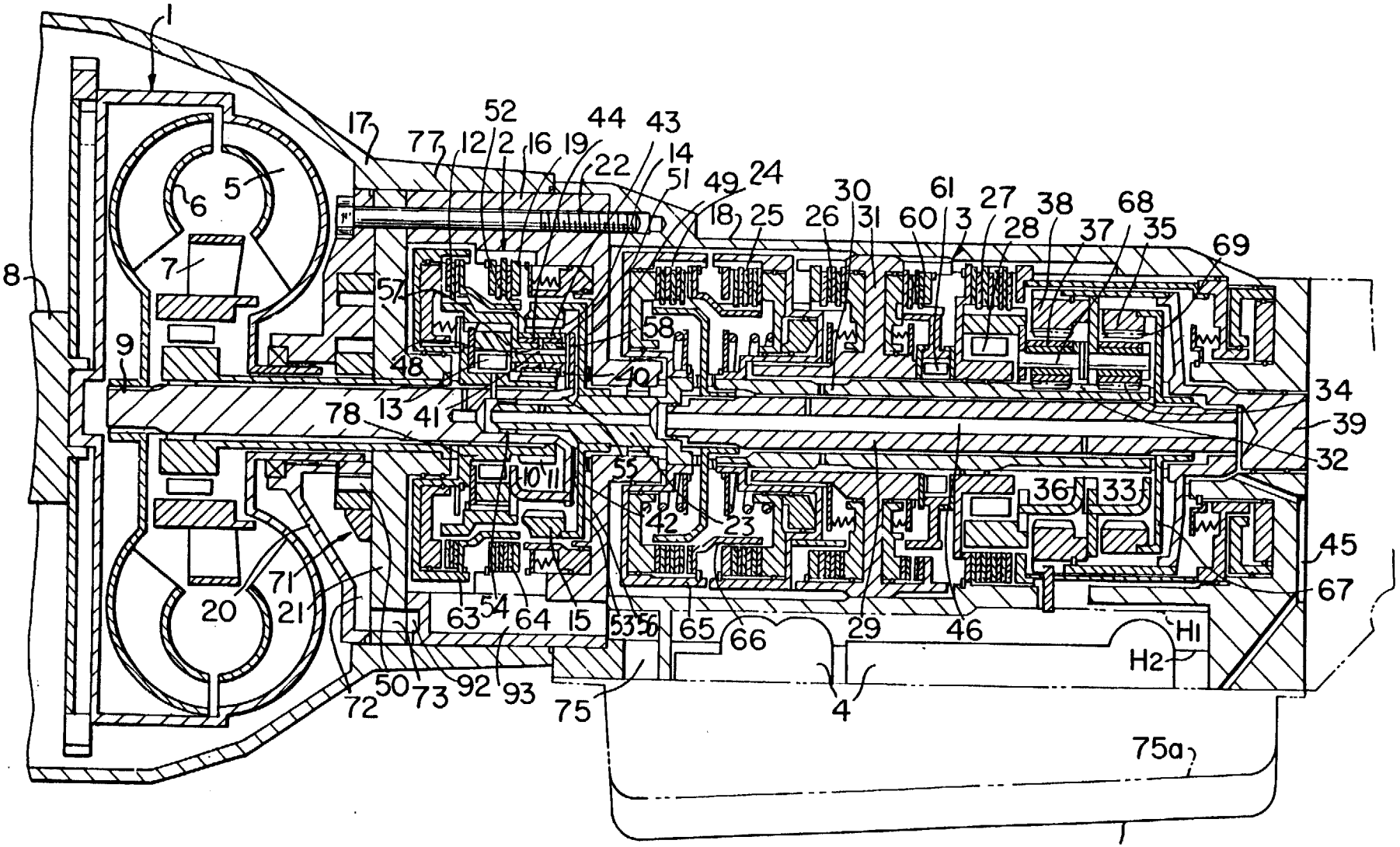
FIG. 2 is a longitudinal cross-sectional view of one embodiment of the automatic transmission with overdrive according to the present invention.

FIG. 2 is a longitudinal cross-sectional view of an automatic transmission having an overdrive gear mechanism 2 according to the present invention. In FIG. 2 like parts are designated with like reference numerals in common with those given in FIG. 1.

The turbine shaft 9 serves as an output shaft for the torque converter 1, as well as an input shaft for the overdrive gear mechanism, being coupled to the carrier 10 for a planetary gear unit in the overdrive gear mechanism. The carrier 10 is formed with a pinion shaft 49, while needle bearings 43, 44 are fitted on the pinion shaft 49 in two rows. The planetary pinion 14 is rotatably supported by the pinion shaft 49 through the medium of needle bearings 43, 44, and meshes with the sun gear 11 and ring gear 15. Thrust washers 51, 52 are provided between the planetary pinion 14 and the carrier 10 on the opposite sides, respectively. The sun gear shaft 78 carrying the sun gear 11 thereon is coupled to a clutch cylinder 63. A hub 64 is splined to the clutch cylinder 63. A multiple disc clutch 12 is positioned between the clutch cylinder 63 and the carrier 10, while a one-way clutch 13 is provided between the sun gear shaft 78 and the carrier 10. A multiple disc brake 19 is provided between the hub 64 and the overdrive case 16 accommodating the overdrive gear mechanism therein. The housing 17 encompasses the torque converter 1, and is formed with an extension portion 77 having a cylindrical inner surface. The overdrive case 16 has an cylindrical wall fitted in the inner cylindrical surface of the extension portion 77. A flange 53 is coupled to the ring gear 15 and splined to an input shaft 23 of the underdrive gear mechanism 3. The input shaft 23 is positioned in coaxial relation to the turbine shaft 9 and coupled to the clutch cylinder 65 in the underdrive gear mechanism 3. The overdrive case includes a bush 105 rotatably supporting the input shaft 23 of the underdrive gear mechanism. A bearing 54 is interposed between the turbine shaft 9 and the input shaft 23, while a washer 56 is positioned between the carrier 10 and the flange 53. The oil pump body 20, oil pump cover 21, overdrive case 16 and transmission case 18 are fastened together by means of two or more bolts 22.

The relationship between change-gear positions and operations of respective clutches and brakes in the automatic transmission thus arranged is shown in the following Table 1.

TABLE 1

| shift position | 12 | 24 | 25 | 19 | 26 | 27 | 13 | 28 | 61 | 60 |
|---|---|---|---|---|---|---|---|---|---|---|
| P | ○ | X | X | X | X | ○ | — | — | — | X |
| R | ○ | X | ○ | X | X | ○ | RC | RC | OR | X |
| N | ○ | X | X | X | X | X | — | — | — | X |
| D 1st speed drive | ○ | ○ | X | X | X | X | RC | RC | R*C | X |
| 2nd speed drive | ○ | ○ | X | X | ○ | X | RC | OR | RC | ○ |
| 3rd speed drive | ○ | ○ | ○ | X | X | X | RC | OR | OR | ○ |
| OD | X | ○ | ○ | ○ | X | X | OR | OR | OR | ○ |
| 2 1st speed drive | ○ | ○ | X | X | X | X | RC | RC | R*C | X |
| 2nd speed drive | ○ | ○ | X | X | ○ | X | RC | OR | RC | ○ |
| L | ○ | ○ | X | X | X | ○ | RC | RC | OR | X |

Reference characters and symbols shown therein designate the following:

P—parking range
R—reverse drive
N—neutral range
D—drive range
2—second range
L—low range
O—engaged condition
X—released condition
RC—locked condition
OR—overrun condition
*—torque is not transmitted In the lubrication and cooling of respective components constituting the overdrive gear mechanism 2 and underdrive gear mechanism 3. Oil which has been pressurized by the oil pump 71 is adjusted to a given pressure level by the hydraulic control device 4. The oil thus adjusted is delivered via oil passage 45 in the transmission case 18 and an oil passage in the intermediate shaft 29 to respective components of the overdrive gear mechanism 2 and underdrive gear mechanism 3 for lubrication and cooling. Specific oil passage is provided in the overdrive gear mechanism 2 for lubricating and cooling the neighborhood of the needle bearings 43, 44. In other words, an oil chamber 55 is defined by the input shaft 23 and turbine shaft 9 therebetween. The oil chamber 55 is communicated with an inner bore provided in the input shaft 23 via a hole 42 provided in the wall of the input shaft 23. Oil passage 40 runs in the radial direction of the carrier 10 and is communicated with the oil chamber 55 at one end thereof, and blocked with a plug 58 at the other. An oil passage 40 runs through the pinion shaft 49 in the axial direction. The oil passage 41 is connected to the oil passage 40 at one end thereof and blocked with a plug 57 at the other. Midway of the pinion shaft 49 as viewed in the axial direction, there is provided an oil passage 48 which is connected to the oil passage 41 at one end and terminates between the needle bearings 43, 44. Respective elements in the neighborhood of the needle bearings 43, 44 are lubricated and cooled with oil of a given pressure, which is supplied through hole 42, oil chamber 55 and oil passages 40, 41, 48.

Figure 3:
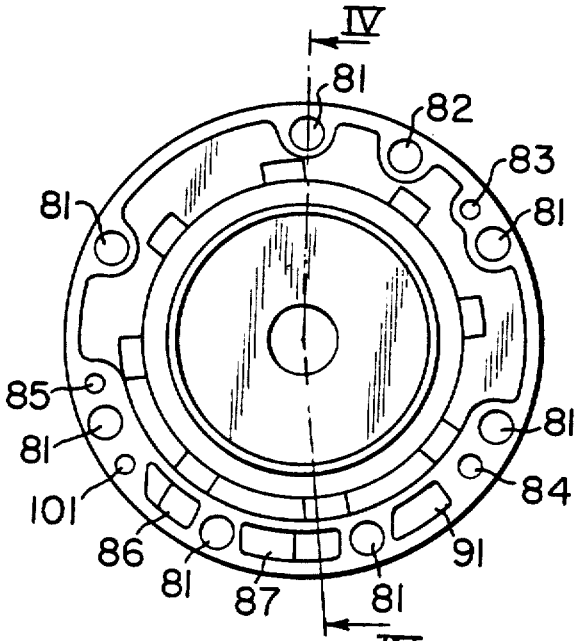
FIG. 3 is a left-hand side view of an overdrive case.
Figure 4:
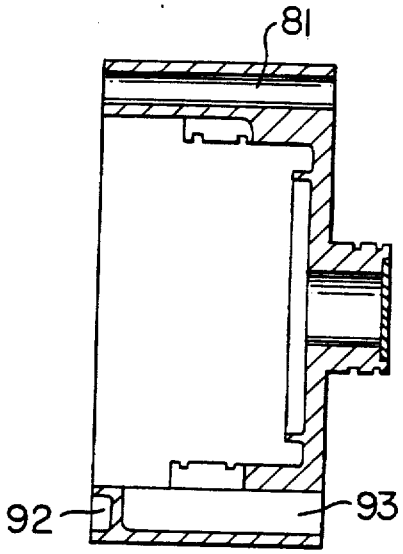
FIG. 4 is a cross-sectional view of the overdrive case taken along the line IV—IV of FIG. 3.
Figure 5:
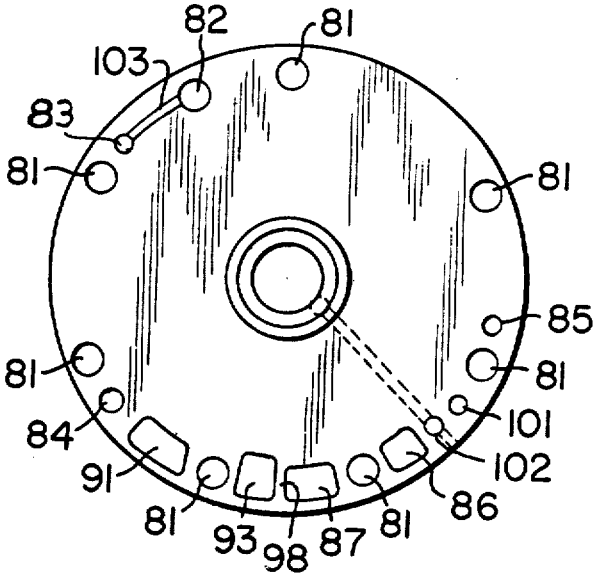
FIG. 5 is a right-hand side view of the overdrive case.

FIG. 3 shows the left-hand side view of the overdrive case 16 (on the side of the torque converter 1). FIG. 4 is a cross-sectional view taken along the line IV—IV of FIG. 3. FIG. 5 is a right-hand side view of the overdrive case 16 (on the side of underdrive gear mechanism 3). The vertical direction shown in FIGS. 3 and 5 correponds to the direction normal to the ground, while the left-hand side thereof corresponds to the side of the torque converter, and the right-hand side thereof corresponds to the side of the underdrive gear mechanism 3. A hole 81 is adapted to have a bolt 22 extend therethrough and a breather passage 82 is provided in the underdrive gear mechanism connecting a breather port (not shown) to a hole in the oil pump body 20. An oil return passage 83 is provided under the breather passage 82 for preventing leakage of oil from the breather port in the underdrive gear mechanism 3. The breather passage 82 is communicated with the oil return passage 83 via groove 103 in the end surface of the overdrive case 16 on the side of the underdrive gear mechanism 3. In this manner, oil within the breather passage 82 is returned along the oil return passage 83, without leaking from the breather port. A supply passage 84 is provided for supplying oil from the hydraulic control device 4 to the torque converter 1. An exhaust passage 85 operates for returning oil from the torque converter 1 to the hydraulic control device 4. Intake passages 86, 87 are for introducing oil from the oil pan 75 positioned under the underdrive gear mechanisms 3 to the oil pump 71. A discharge passage 91 introduces oil pressurized by the oil pump 71 to the hydraulic control device 4 positioned under the underdrive gear mechanism 3. The intake passage 87 is connected to an oil passage 73 in the oil pump cover 21 at the front end of the passage 87, and connected to an oil passage (not shown) positioned in side-by-side relationship to the oil passage 76 through the medium of a wall at the rear end of the passage 87. The intake passage 87 is positioned in the lowermost portion of the overdrive case for connection with the oil passage 73 and formed with an enlarged portion 92 at the front end of the passage 87. The exhaust passage 93 is formed in the lowermost portion of the periphery of the overdrive case 16 in side-by-side relationship to the intake passage 87 and communicated with a lower portion of a space within the overdrive case 16, while being connected to the oil pan 75 at the rear end of the passage 93. The intake passage 87 and the exhaust passage 93 are partitioned by a wall 98. A passage 101 connects the hydraulic control device 4 to the multiple disc clutch 12 for introducing a hydraulic pressure to the latter, and passage 102 connects the hydraulic control device 4 to the clutch cylinder 65 for introducing a hydraulic pressure thereto. Passages 82, 83, 84, 85, 86, 87, 91, 101 run through a peripheral portion of the overdrive case 16 in the axial direction.

Oil which has lubricated and cooled, respectively, components of the overdrive gear mechanism 2 is then returned via return passage 93 to an oil pan 75. To this end, the level of oil under the underdrive gear mechanism is lowered from H1 to H2. The level H2 is so set as to be lower than the position of return passage 93. The oil pan 75 having a greater depth than that of the oil pan 75a is used for accommodating oil of an optimum amount, with the oil level being maintained lowered to the level H2. Alternatively, this may be attained by simply lowering an attaching position of the oil pan 75a to the transmission case 18, without modifying the oil pan 75a.

As is apparent from the foregoing description, the passages 84, 85, 86, 87, 91 which connect the oil pan 75 to the hydraulic control device 4, and the torque converter 1 to the oil pump 71 are formed in the overdrive case 16. In addition, the passages 101, 102 which connect the clutch cylinder 63 (multiple disc clutch 12) to the hydraulic control device 4 are formed in the overdrive case, as well. As a result, the hydraulic control device 4 need not be provided under the underdrive gear mechanism 2. In addition, in case the overdrive gear mechanism is incorporated in the automatic transmission, the hydraulic control device 4 may be positioned under the underdrive gear mechanism 3, thus avoiding a need to additionally provide an oil pan. Furthermore, a single oil pan is used, so that the supplying of oil and checking of the oil amount may be conducted with ease.

While specific embodiments of the invention have been shown and described in detail to illustrate the application of the inventive principles, it will be understood that the invention may be embodied otherwise without departing from such principles.

What is claimed is:

1. An automatic transmission with overdrive comprising:

a hydrokinetic torque converter having a pump impeller, stator vanes and turbine vanes;

a housing encompassing the outer periphery of said torque converter therein;

an oil pump having an oil pump body positioned adjacent to said torque converter, and an oil pump cover partitioning a pump chamber from said oil pump body;

an overdrive gear mechanism positioned adjacent to said oil pump but in coaxial relation to said torque converter, with an input side of said mechanism being coupled to said turbine vanes in said torque converter, thereby transmitting torque from an input side to an output side at a gear reduction ratio not greater than 1;

an overdrive case *having a cylindrical wall portion* surrounding said overdrive gear mechanism in cooperation with said oil pump cover and having a multiple disc brake operatively mounted within an inner circumferential face of said overdrive case;

an underdrive gear mechanism positioned adjacent to said overdrive gear mechanism but in coaxial relation to said torque converter, having an input shaft coupled to an output side of said overdrive gear mechanism, thereby transmitting torque from an input side to an output side of said underdrive gear mechanism at a plurality of reduction ratios of not less than 1, said overdrive case including a bush rotatably supporting therein said input shaft of said underdrive gear mechanism;

a transmission case encompassing the top and side of elements of said underdrive gear mechanism in cooperation with said overdrive case;

a hydraulic control device arranged under said underdrive gear mechanism and controlling a hydraulic pressure to be delivered to said overdrive gear mechanism and underdrive gear mechanism; and an oil pan encompassing the undersurface of said underdrive gear mechanism;

said overdrive case being formed *through said cylindrical wall portion in a longitudinal direction thereof* with a first passage connected to an inlet port of said oil pump, a second passage connected to a discharge port of said oil pump, a third passage connected to an inlet port of said torque converter, and a fourth passage connected to an outlet port of said torque converter, with the second, third, and fourth passages being connected to said hydraulic control device through oil passages within the transmission case corresponding to the oil passages thereof, *and a plurality of bolts provided so as to pass through said oil pump body, said oil pump cover and said overdrive case longitudinally through said cylindrical wall portion thereof to said transmission case in order to fasten together said oil pump body, said oil pump cover and said overdrive case with said transmission case.*

2. An automatic transmission as set forth in claim 1, wherein said overdrive gear mechanism includes frictional engaging means operable by a hydraulic pressure, and a passage connecting said frictional engaging means to said hydraulic control device through oil passages within the transmission case corresponding to the oil passages thereof, said passage being formed in said overdrive case.

3. An automatic transmission as set forth in claim 2, wherein said frictional engaging means is positioned in close vicinity to said overdrive case internally thereof, with a passage connecting said frictional engaging means to said hydraulic control device through oil passages within the transmission case corresponding to the oil passages thereof being formed in said overdrive case.

4. An automatic transmission as set forth in claim 1, wherein there are formed in said hydraulic control device to said torque converter, a passage for returning oil from said torque converter to said hydraulic control device, a passage for introducing oil from an oil pan positioned under said underdrive gear mechanism to said oil pump, a passage leading to said oil pump cover, a passage for supplying oil pressurized by said oil pump to said hydraulic control device, a passage connecting said hydraulic control device to a multiple disc clutch in said overdrive gear mechanism, and a passage connecting said hydraulic control device through oil passages within the transmission case corresponding to the oil passages thereof to a clutch cylinder in said overdrive gear mechanism.

5. In the preamble of claim 1, the improvement wherein said overdrive case is formed with a first passage connected to an inlet portion of said oil pump, and a second passage connected to a discharge portion of said oil pump, said second passage being connected to said hydraulic control device.

6. In the preamble of claim 1, the improvements wher 'n said overdrive case is formed with a third passage c nected to an inlet portion of said torque converter, and a fourth passage connected to an outlet portion of said torque converter, said third and fourth passages being connected to said hydraulic control device.

7. In an automatic transmission with overdrive, including:

a hydrokinetic torque converter having a pump impeller, stator vanes and turbine vanes;

a housing encompassing the outer periphery of said torque converter therein;

an oil pump having an oil pump body positioned adjacent to said torque converter, and an oil pump cover partitioning a pump chamber from said oil pump body;

an overdrive gear mechanism positioned adjacent to said oil pump but in coaxial relation to said torque converter, with an input side of said mechanism being coupled to said turbine vanes in said torque converter, thereby transmitting torque from an input side to an output side at a gear reduction ratio not greater than 1;

an overdrive case *having a cylindrical wall portion* surrounding said overdrive gear mechanism in cooperation with said oil pump cover;

an underdrive gear mechanism positioned adjacent to said overdrive gear mechanism but in coaxial relation to said torque converter, with an input side thereof being coupled to an output side of said overdrive gear mechanism, thereby transmitting torque from an input side to an output side at a plurality of reduction ratios of not less than 1;

a transmission case encompassing the top and side of elements of said underdrive gear mechanism in cooperation with said overdrive case;

a hydraulic control device arranged under said underdrive gear mechanism and controlling a hydraulic pressure to be delivered to said overdrive gear mechanism and underdrive gear mechanism; and an oil pan encompassing the undersurface of said underdrive gear mechanism;

the improvement wherein said overdrive case is formed *through said cylindrical wall portion in a longitudinal direction thereof* with a first passage connected to an inlet portion of said oil pump, and a second passage connected to a discharge portion of said oil pump, said second passage being connected to said hydraulic control device through oil passages with the transmission case corresponding to the oil passages thereof, *and a plurality of bolts provided so as to pass through said oil pump body, said oil pump cover and said overdrive case longitudinally through said cylindrical wall portion thereof to said transmission case in order to fasten together said oil pump body, said oil pump cover and said overdrive case with said transmission case.*

8. In an automatic transmission with overdrive, including:

a hydrokinetic torque converter having a pump impeller, stator vanes and turbine vanes;

a housing encompassing the outer periphery of said torque converter therein;

an oil pump having an oil pump body positioned adjacent to said torque converter, and an oil pump cover partitioning a pump chamber from said oil pump body;

an overdrive gear mechanism positioned adjacent to said oil pump but in coaxial relation to said torque converter, with an input side of said mechanism being coupled to said turbine vanes in said torque converter, thereby transmitting torque from an input side to an output side at a gear reduction ratio not greater than 1;

an overdrive case *having a cylindrical wall portion* surrounding said overdrive gear mechanism in cooperation with said oil pump cover;

an underdrive gear mechanism positioned adjacent to said overdrive gear mechanism but in coaxial relation to said torque converter, with an input side thereof being coupled to an output side of said overdrive gear mechanism, thereby transmitting torque from an input side to an output side at a plurality of reduction ratios of not less than 1;

a transmission case encompassing the top and side of elements of said underdrive gear mechanism in cooperation with said overdrive case;

a hydraulic control device arranged under said underdrive gear mechanism and controlling a hydraulic pressure to be delivered to said overdrive gear mechanism and underdrive gear mechanism; and an oil pan encompassing the undersurface of said underdrive gear mechanism;

the improvement wherein said overdrive case is formed *through said cylindrical wall portion in a longitudinal direction thereof* with a third passage connected to an inlet portion of said torque converter, and a fourth passage connected to an outlet portion of said torque converter, said third and fourth passages being connected to said hydraulic control device through oil passages within the transmission case corresponding to the oil passages thereof, *and a plurality of bolts provided so as to pass through said oil pump body, said oil pump cover and said overdrive case longitudinally through said cylindrical wall portion thereof to said transmission case in order to fasten together said oil pump body, said oil pump cover and said overdrive case with said transmission case.*

* * * * *

UNITED STATES PATENT AND TRADEMARK OFFICE

CERTIFICATE OF CORRECTION

PATENT NO. : Re. 33,707

DATED : October 1, 1991

INVENTOR(S) : Yoshio Shindo, et al

It is certified that error appears in the above-indentified patent and that said Letters Patent is hereby corrected as shown below:

On the title page, item [73] Assignee, should read as follows:

--[73] Assignee: Toyota Jidosha Kabushiki Kaisha, Tokyo, Japan--.

Signed and Sealed this

Seventh Day of June, 1994

Bruce Lehman

*Attest:*

BRUCE LEHMAN

*Attesting Officer*

*Commissioner of Patents and Trademarks*